United States Patent [19]

Ikuta

[11] Patent Number: 4,692,879
[45] Date of Patent: Sep. 8, 1987

[54] METHOD OF AND APPARATUS FOR FORMING THE ADDRESS SIGNALS OF A SCREEN MEMORY OF A HALF TONE DOT GENERATOR

[75] Inventor: Kunio Ikuta, Kyoto, Japan

[73] Assignee: Dainippon Screen Mfg. Co., Ltd., Kyoto, Japan

[21] Appl. No.: 698,522

[22] Filed: Feb. 5, 1985

[30] Foreign Application Priority Data

Feb. 9, 1984 [JP] Japan ................................. 59-23705

[51] Int. Cl.$^4$ ......................... H04N 1/46; H04N 1/40
[52] U.S. Cl. .................................. 364/518; 364/523; 358/78; 358/283
[58] Field of Search .............. 364/518, 520, 521, 523, 364/900 MS File; 358/75, 78, 79, 263, 283

[56] References Cited

U.S. PATENT DOCUMENTS

| 4,185,304 | 1/1980 | Holladay | 358/283 |
| 4,350,996 | 9/1982 | Rosenfeld | 358/28 |
| 4,413,286 | 11/1983 | Boston | 358/283 |
| 4,456,924 | 6/1984 | Rosenfeld | 358/78 |
| 4,486,788 | 12/1984 | Yamada | 358/283 |

Primary Examiner—Felix D. Gruber
Assistant Examiner—Daniel W. Juffernbruch
Attorney, Agent, or Firm—Lowe Price LeBlanc Becker & Shur

[57] ABSTRACT

Halftone dots are formed pixel by pixel onto a photosensitive film of a size $P \times P$ in an improved manner by using a screen memory storing thresholds, each of which corresponds to each of $m \times n$ sub-cells of a halftone dot area of the size $S \times S$. In accordance with the invention, four table memories are prepared by respectively storing values (1) $-y_n \cdot P \cdot \sin \theta$, (2) $x_n \cdot P \cdot \cos \theta / \frac{S}{m}$, (3) $y_n \cdot P \cdot \cos \theta / \frac{S}{m}$ and (4) $x_n \cdot P \cdot \sin \theta / \frac{S}{m}$ with $y_n$ being the main scanning direction addresses and $x_n$ being the sub-scanning direction addresses. Values read from the first table memory and values read from the second table memory are summed to obtain the sub-scanning reading addresses of the screen memory, while the values read from the third table memory and the values read from the fourth table memory are summed to form the main scanning reading addresses of the screen memory. At this junction, the values (1) to (4) to be stored in each of the table memories are permitted to be residues, taking advantage of the characteristic that the values are periodic. Additionally, the memory capacity required for the operation can be permitted to be smaller by taking advantage of the characteristic that the values of interest form an arithmetic series.

13 Claims, 9 Drawing Figures

MEMORY STORING ADDRESS DATA

METHOD OF AND APPARATUS FOR FORMING THE ADDRESS SIGNALS OF A SCREEN MEMORY OF A HALF TONE DOT GENERATOR

FIELD OF THE INVENTION

This invention relates to halftone dot generation, more particularly to a method and apparatus for forming an address signal for a screen memory in a halftone dot generator.

BACKGROUND OF THE INVENTION

It is well known that electronic color separation film production by means of an image reproducing system is carried out according to the following method. That is, an original mounted on an input drum is helically scanned by an input head to obtain an image signal thereof. The image signal, after undergoing color and gradation correction processes in an image processor, is input to a comparator to be compared with a halftone dot signal being output from a halftone dot generator to produce a recording signal for driving a recording head, by which a so-called screened image is reproduced onto a photosensitive film mounted on an output drum.

The halftone dot generator comprises a screen memory, in which thresholds corresponding to the density values of halftone dot sub-cells in arranged an matrix are stored. Each of the thresholds is output according to the address of the corresponding recording point to said comparator. The comparator makes the recording head expose (or not expose) the photosensitive film when the density value of the image signal is higher than the corresponding threshold, or not expose (or expose) the film when the density value of the image signal is lower than the corresponding threshold.

Since a screened image is to be produced using a plurality of halftone dots, the thresholds stored in the screen memory are periodically read again and again in accordance with the proceeding of the recording process.

In that regard, it is well known that, when each of color separation images Y (Yellow, M (Magenta), C (Cyan) and K (Black) is recorded at the same screen angle, a moire effect is produced, which deteriorates the quality of the synthesized image of the four color separation images. Therefore, in order to avoid the undesirable phenomenon, the screen angles of the color separation images M, C, Y and K are, for example, determined to be at −15, 15, 0 and 45 respectively.

In reading out the thresholds under the condition of a screen angle, there must be input to the screen memory sub-scanning addresses $X_A$ and main scanning addresses $Y_A$ expressed by equations:

$$X_A = -y_n \cdot R \cdot \sin\theta + x_n \cdot R \cdot \cos\theta \\ Y_A = y_n \cdot R \cdot \cos\theta + x_n \cdot R \cdot \sin\theta \quad \Bigg\} \quad (A)$$

wherein $x_n$ is the position data of the sub-scanning direction (pixel number), $y_n$ is the position data of the main scanning direction (pixel number), while R is the ratio between the length of each side of one pixel and that of one halftone sub-cell.

U.S. Pat. No. 4,350,996 discloses a method, by which, based on the equations (A), the terms pertaining to each of the directions $y_n$ and $x_n$ is respectively computed using a multiplier, and the products are summed. However, the multiplier is required to have a large capacity to perform the computation, which is a factor in increasing the manufacturing cost thereof. The above mentioned patent also discloses a method, by which each term of the equations (A) is increased propotionally according to the advance of the main and the sub-scanning positions, and then the terms pertaining to $x_x$ and $y_n$ are summed up.

However this method necessitates a circuit for increasing each of the terms, therefore the circuit must have greater capacity in order to suppress the gross error produced during the computation process.

SUMMARY OF THE INVENTION

Accordingly, it is an object of this invention to provide an improved method and apparatus for forming an address signal for a screen memory comprised in a halftone dot generator.

Another object of this invention is to provide an apparatus capable of forming an address signal for a screen memory by using table memories of small capacity and adders.

A further object of this invention is to provide an apparatus applicable when a plurality of pixels are recorded in the sub-scanning direction simultaneously.

Other objects will, in part, be obvious and will, in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

In accordance with this invention, the relation between the addresses $(x_n, y_n)$ of the recording point and the addresses $(X_A, Y_A)$ of the screen memory is expressed by equations:

$$X_A = y_n \cdot \Delta X + x_n \cdot \Delta' X \\ Y_A = y_n \cdot \Delta Y + x_n \cdot \Delta' Y \quad \Bigg\} \quad (B)$$

There is at first generated a signal representative of the addresses $(y_n, x_n)$ of the recording point according to signals obtained from rotary encoders, and the generated signal is used as a reading address signal for the corresponding values $y_n \cdot \Delta X$, $x_n \cdot \Delta' X$, $y_n \cdot \Delta Y$ and $x_n \cdot \Delta' Y$ stored in the screen memory. The sub-scanning addresses $X_A$ of the screen memory are then obtained by summing up the values $y_n \cdot \Delta X$ and $x_n \cdot \Delta' X$, while the main scanning addresses $Y_A$ of the screen memory are obtained by summing up the values $y_n \cdot \Delta Y$ and $x_n \cdot \Delta' Y$.

In this connection, in view of the fact that the values $y_n \cdot \Delta' X$ are expressible as $y_n \cdot \Delta X = \alpha_1 m + \beta_1$ ($\alpha_1$: an integer, $0 \leq \beta_1 \leq m-1$), each of the four values are periodic values. Therefore, the first term $_1 m$ can be disregarded in performing a computation of the equation (A). Practically, only the possible values of the second term $\beta_1$ are necessary for specifying the addresses $(x_n, y_n)$, which fact allows the screen memory to have a smaller capacity.

Further considering a matrix composed of the values $y_n \cdot \Delta X$ corresponding to each of the values $y_n$ arranged in I ranks by J columns, the value located at the intersection of each of E ranks and F columns ($0 \leq E \leq I-1$, $0 \leq F < J-1$) can be obtained from an expression $EJ \cdot \Delta X + F \cdot \Delta X$.

Therefore, at first the values of the first rank of said matrix are stored in a first table memory with addresses 0 to $I-1$ attached, while the values of the first column of said matrix are stored in a second table memory with addresses 0 to $J-1$. Then the addresses 0 to $J-1$ are successively given to the first table memory, and every time the value $y_n$ becomes an integral multiple of the number I, the address number given to the second table memory is increased by one to read out the values $EJ \cdot \Delta X$ and $F \cdot \Delta X$ corresponding to the recording point. The value $x_n \cdot \Delta'Y$ is obtained in the same manner, and the values $y_n \cdot \Delta X$ and $x_n \cdot \Delta'Y$ are summed up to form the sub-scanning addresses $X_A$ of the screen memory. The main scanning addresses $Y_A$ are also obtained in the same way.

In this case, each of the values to be stored in the first and the second table memories can of course be suppressed below said number m to allow the memory to have smaller capacity.

When pixels situated on a plurality of sub-scanning lines are to be scanned simultaneously, the corresponding plural addresses of the screen memory must be generated simultaneously. In such a case, addresses $Z x_n$ (Z: the number of the pixels recorded at a time) are used to read out the corresponding values $Z x_n \cdot \Delta X$ ($Z x_n \cdot \Delta'Y$), and the values $Z x_n \cdot \Delta X$ ($Z x_n \cdot \Delta'Y$) are added to the values $y_n \cdot \Delta X$ and to values $K \cdot \Delta'X$ ($K \cdot \Delta'Y$) [K: 0 to 1] to provide the sub-scanning (main scanning) addresses for the screen memory.

The above and other objects and features of this invention can be appreciated more fully from the following detailed description when read with reference to the accompanying drawings.

DETAILED DESCRIPTION OF A PREFERRED EMBODIMENT OF THE INVENTION

Screen memory addresses are determined as follows. To form a halftone dot signal of screen angle $\theta$ using an image reproducing system, addresses ($x_n$, $y_n$) of the original coordinate system must be converted to the corresponding addresses ($X_A$, $Y_A$) of the halftone screen rotated by the angle $\theta$ according to equations:

$$\left. \begin{array}{l} X_A = -y_n \cdot \sin\theta + x_n \cdot \cos\theta \\ Y_A = y_n \cdot \cos\theta + x_n \sin\theta \end{array} \right\} \quad (1)$$

Figure 2:
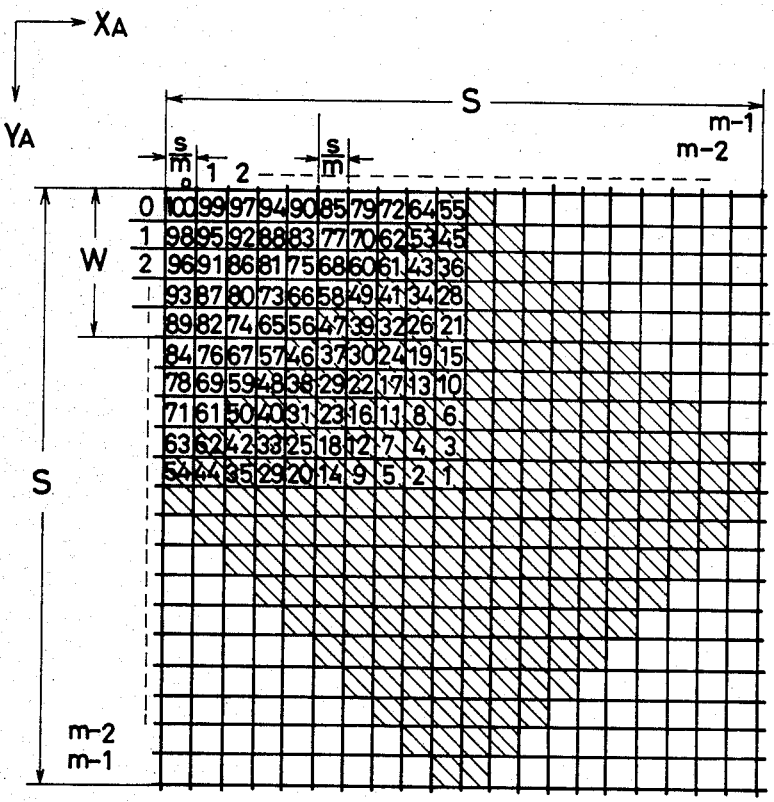
FIG. 2 shows a matrix of thresholds stored in the screen memory.
Figure 3:
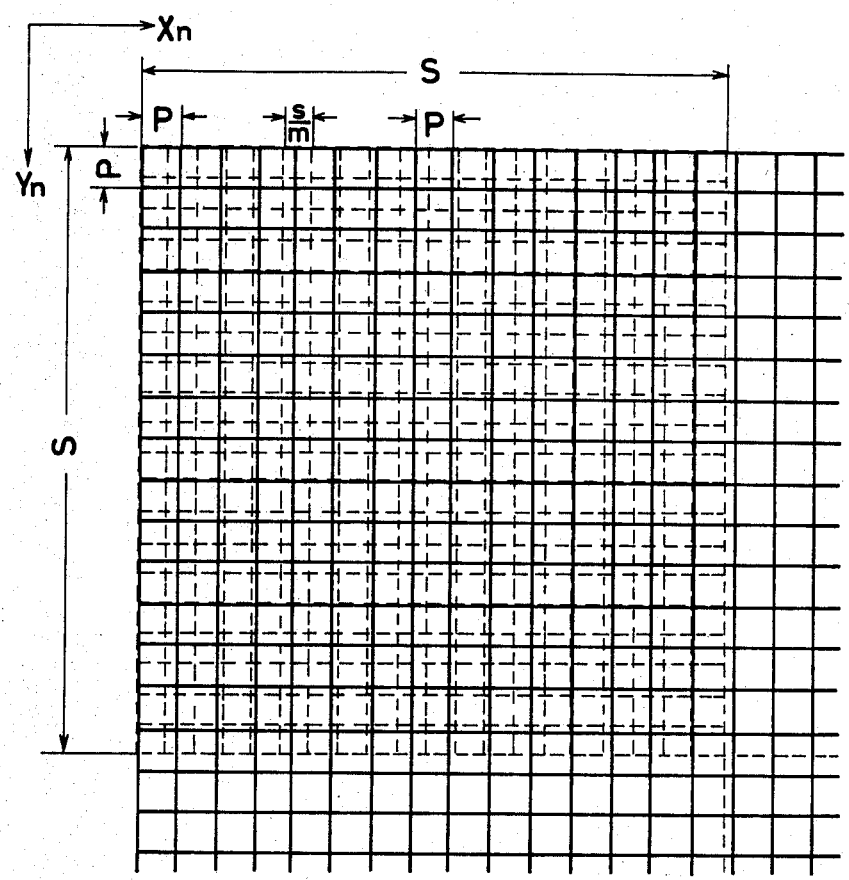
FIG. 3 shows a relation between screen memory cells and recording pixels.
Figure 4:
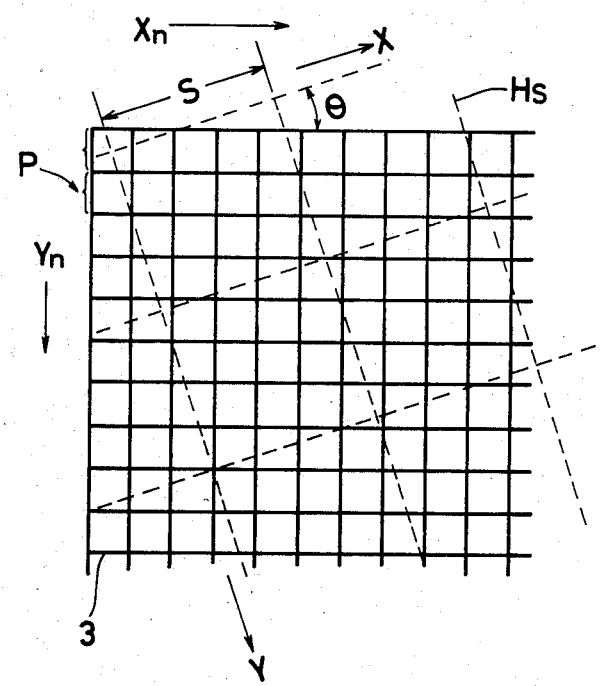
FIG. 4 shows a relation between a photosensitive film and the screen memory.

It is then assumed that the length of each side of a unit of a halftone dot screen memory (called a "screen memory unit" hereinafter) corresponding to one halftone dot is S as shown in FIG. 2, the length of each side of a cell the unit of in the unit of the screen memory unit corresponding to one halftone sub-cell (called a "screen memory cell" hereinafter) is s/m (m: a specific number), the length of each side of one recording pixel is P as shown in FIG. 3, and the screen angle $\theta$ is $\theta = 0$.

The screen memory stores a plurality of thresholds, each of which is used for exposing the corresponding portion of a photosensitive film. In order to expose the recording points ($x_n$, $y_n$), the thresholds stored in the corresponding addresses $$\left( x_n \cdot \frac{P}{\frac{\delta}{m}}, \; y_n \cdot \frac{P}{\frac{\delta}{m}} \right)$$

are output. This process is carried out on every halftone sub-cell with advance of a recording head 8 (the revolution of a recording drum).

Notewothily at this juncture, halftone sub-cell thresholds of the same arrangement are periodically output with the increase of the values $x_n$ or $y_n$. In other words, every time each of the values $$x_n \frac{P}{\frac{s}{m}} \text{ or } y_n \frac{P}{\frac{s}{m}}$$

exceeds the value m, the corresponding reading address $X_A$ or $Y_A$ of the screen memory is brought back to the initial address, conseqently the address $X_A$ or $Y_A$ take values in the range of 0 to $M-1$ (for example in the embodiment described afterwards, the addresses $X_A$ and $Y_A$ are $0 < X_A < 255$ and $0 < Y_A < 255$).

Therefore, the addresses $X_A$ and $Y_A$ of the screen pattern memory can be expressed as equations:

$$\left. \begin{array}{l} X_A = -y_n \cdot \dfrac{P}{\left(\dfrac{\delta}{m}\right)} \sin\theta + x_n \cdot \dfrac{P}{\left(\dfrac{\delta}{m}\right)} \cos\theta \\[2ex] Y_A = y_n \cdot \dfrac{P}{\left(\dfrac{\delta}{m}\right)} \cos\theta + x_n \cdot \dfrac{P}{\left(\dfrac{\delta}{m}\right)} \sin\theta \end{array} \right\} \quad (2)$$

Since both the values $x_n \cdot P \cdot (s/m)$ and $y_n \cdot P \cdot (s/m)$ are periodic as mentioned before, the terms of the right members are also periodic.

The equations (2) can be simply expressed as equations:

$$\left. \begin{array}{l} X_A = y_n \cdot \Delta X + x_n \cdot \Delta'X \\ Y_A = y_n \cdot \Delta Y + x_n \cdot \Delta'Y \end{array} \right\} \quad (3)$$

when

-continued $$\Delta X = -\frac{P}{\left(\frac{\delta}{m}\right)} \sin \theta$$

$$= \frac{P}{\left(\frac{\delta}{m}\right)} \cdot \sin (180° - \theta),$$

$$\Delta'X = \frac{P}{\left(\frac{\delta}{m}\right)} \cdot \cos \theta,$$

$$\Delta Y = \frac{P}{\left(\frac{\delta}{m}\right)} \cdot \cos \theta,$$

$$\Delta'Y = \frac{P}{\left(\frac{\delta}{m}\right)} \cdot \sin \theta.$$

When the values of each term of the right members of the equations (3) are stored beforehand, the addresses $X_A$ or $Y_A$ can be obtained by way of a simple addition. Therefore, by previously computing the values of said terms and storing them into a memory, the addresses $X_A$ and $Y_A$ can be obtained by summing up the values of the terms according to the recording point being stored in the memory.

Furthermore, since the terms $$x_n \cdot P/\frac{S}{m} \text{ and } y_n \cdot P/\frac{S}{m}$$

are periodic, the memory is allowed to store only the period value $r_i$ (i: 1, 2, 3, 4) as follows or to have smaller capacity. That is, assuming that $y_n \cdot \Delta X$: $r_1$, $x_n \Delta'Y$: $r_2$, $y_n \cdot \Delta Y$: $r_3$ and $x_n \Delta'Y$: $r_4$, the values $r_1$, $r_2$, $r_3$ and $r_4$ are allowed to be $0 \leq r_1, r_2, r_3, r_4 < m$ respectively. Therefore, the values $r_1$, $r_2$, $r_3$ and $r_4$ can alternatively be expressed as:

$r_1 = y_n \cdot \Delta X \mod m,$ $r_2 = x_n \cdot \Delta'X \mod m,$ $r_3 = y_n \cdot \Delta Y \mod m,$ and $r_4 = x_n \cdot \Delta'Y \mod m,$ wherein mod m means modulo m.

Figure 1:
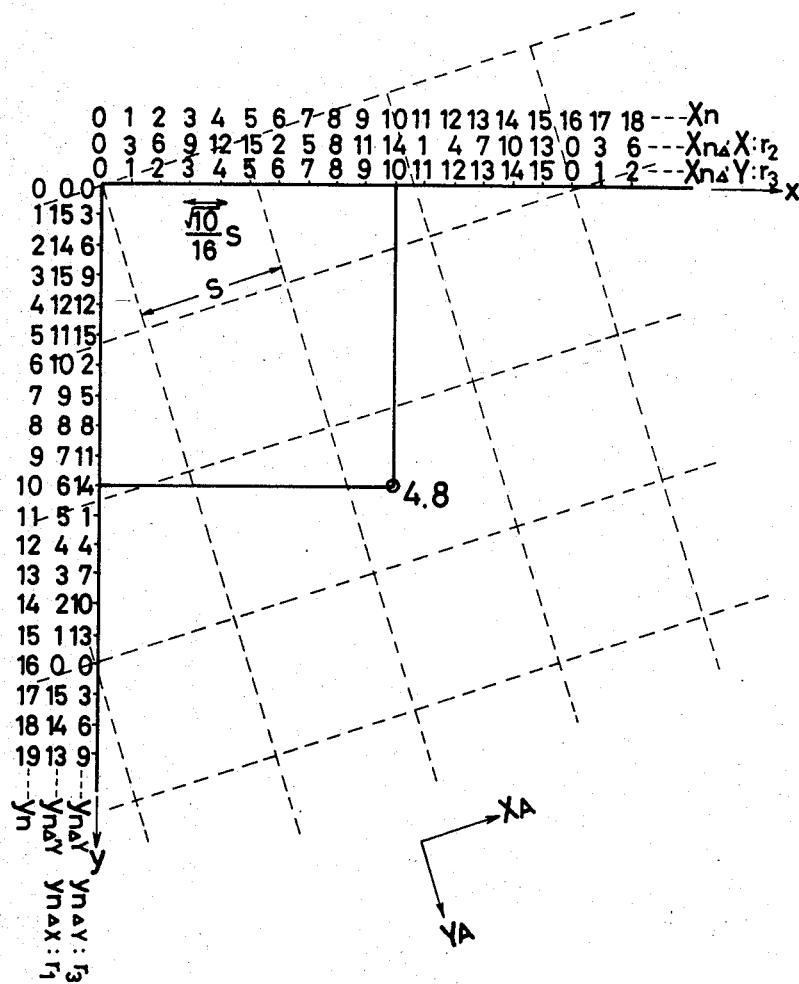
FIG. 1 shows an example of the coordinate system of a screen memory with respect to that of the recording drum.

FIG. 1 shows an example of the coordinate system of a screen memory obtained according to the equations (2) with respect to that of the recording drum, wherein S is the length of each side of the screen memory unit, the value of m is m=16, the length P of each side of a recording pixel is $$P = \frac{\sqrt{10}}{16} S.$$

and the screen angle $\theta$ is $\theta = \tan^{-1} \frac{1}{3}$.

In FIG. 1, the values $r_3$ and $r_1$ corresponding to each of the addresses $y_n$ in the main scanning direction y and the values $r_4$ and $r_2$ corresponding to each of the positions $x_n$ in the sub-scanning direction x are respectively written in parallel. So when $x_n = 10$ and $y_n = 10$, the corresponding address $X_A$ and $Y_A$ of the screen memory are:

$X_A = y_n \cdot \Delta X + x_n \cdot \Delta'X = r_1 + r_2 = 6 + 14 = 20$ $Y_A = y_n \cdot \Delta Y + x_n \cdot \Delta'Y = r_3 + r_4 = 14 + 10 = 24$ wherein since each of the addresses $X_A$ and $Y_A$ is a periodic number ranging from 0 to 15, the conclusive addresses $X_A$ and $Y_A$ are $X_A = 4$ and $Y_A = 8$.

Although the above computation is performed on condition that every parameter is a rational number, actually the parameters are often irrational. Moreover, in practicality the value P and the size of the memory cell $$\left(\frac{S}{m} \times \frac{S}{m}\right)$$

are preferably smaller.

When there are prepared memory cells storing thresholds for all the halftone sub-cells of a photosensitive film comprising, for example, addresses of 64K × 64K (words), the memory must have the capacity of 64K × 64K = 4096M (words), however, said first embodiment only necessitates four memories having capacity of 64K (words).

In order to memorize data of all the addresses $x_n$ and $y_n$ of four color separation images, four sets of said memories are necessary.

The following second embodiment is intended to provide a further reduction in the capacity of the memory. Since the values representative of the addresses $x_n$ or $y_n$ are zero or a positive integer, the values $y_n \cdot \Delta X$, $x_n \cdot \Delta'Y$, $y_n \cdot \Delta Y$ and $x_n \cdot \Delta'Y$ are an arithmetic series.

TABLE 1

|   | 0 | 1 | 2 | ...F | ...J−1 |
|---|---|---|---|---|---|
| 0 | 0 | ΔX | 2ΔX | ...FΔX | ...(J−1)ΔX |
| 1 | JΔX | (J+1)ΔX | (J+2)ΔX | ......... | ...(2J−1)ΔX |
| 2 | 2JΔX | (2J+1)ΔX | (2J+2)ΔX | ......... | ...(3J−1)ΔX |
| . | | | | | |
| . | | | | | |
| E | EJΔX | ............ | | (EJ+F)ΔX | =EJΔX+FΔX |
| . | | | | | |
| . | | | | | |
| I−1 | (I−1)·JΔX | {(I−1)·J+1}ΔX | {(I−1)·J+2}ΔX | ......... | ...(IJ−1)ΔX |

Therefore referring to a matrix (I Ranks × J Columns) of Table 1 concerning the values $y_n \cdot \Delta X$, the values $y_n \cdot \Delta X$ and $y_n \cdot \Delta Y$ at (E, F), and the values $x_n \cdot \Delta'X$, $x_n \cdot \Delta'Y$ at (E', F') can be expressed by equations:

$$\left.\begin{array}{l}y_n \cdot \Delta X = EJ \cdot \Delta X + F \cdot \Delta X \\ x_n \cdot \Delta'X = E'J \cdot \Delta'X + F' \cdot \Delta'X\end{array}\right\} \quad (4)$$

wherein the values E, E', F and F' are $0 \leq E \leq I-1$, $0 \leq E' \leq I-1$, $0 \leq F \leq J-1$, and $0 \leq F' \leq J-1$ respectively. Assuming that $EJ \cdot \Delta X$: $r_{11}$, $F \cdot \Delta X$: $r_{12}$, $E'J \cdot \Delta'X$: $r_{21}$, $F' \cdot \Delta'X$: $r_{22}$, the equations (4) can be expressed as:

$$r_1 = r_{11} + r_{12},$$

$$r_2 = r_{21} + r_{22},$$

$$r_3 = r_{31} + r_{32}, \text{ and}$$

$$r_4 = r_{41} + r_{42}$$

wherein $0 \leq r_{11}, r_{12}, r_{21}, r_{22}, r_{31}, r_{32}, r_{41}, r_{42} < m$. Therefore, the values $r_{11}, r_{12}, r_{21}, r_{22}, r_{31}, r_{32}, r_{41}$ and $r_{42}$ can alternatively be expressed as:

$$r_{11} = EJ \cdot \Delta X \bmod m,$$

$$r_{12} = F \cdot \Delta X \bmod m,$$

$$r_{21} = E'J \cdot \Delta'X \bmod m,$$

$$r_{22} = F' \cdot \Delta'X \bmod m,$$

$$r_{31} = EJ \cdot \Delta Y \bmod m,$$

$$r_{32} = F \cdot \Delta Y \bmod m,$$

$$r_{41} = E'J \cdot \Delta'Y \bmod m, \text{ and}$$

$$r_{42} = F' \cdot \Delta'Y \bmod m.$$

Therefore, by storing the values of the first column and the first rank and by computing the other values according to the addition of the equations (4), the memory capacity can be reduced.

TABLE 2

|   | 0 | 1 | 2 | ... H | ... IJ |
|---|---|---|---|---|---|
| 0 | 0 | $\Delta X$ | $2\Delta X$ | ... $H\Delta X$ | ... $(IJ-1)\Delta X$ |
| 1 | $IJ\Delta X$ | $(IJ+1)\Delta X$ | $(IJ+2)\Delta X$ | ... | ... $(2IJ-1)\Delta X$ |
| 2 | $2IJ\Delta X$ | $(2IJ+1)\Delta X$ | $(2IJ+2)\Delta X$ | ... | ... $(3IJ-1)\Delta X$ |
| G | $GIJ\Delta X$ | ... | ... | $GIJ\Delta H + H\Delta X$ | ... |
| K-1 | $(K-1)\cdot IJ\Delta X$ | $\{(K-1)\cdot IJ - H\}\Delta X$ | $\{(K-1)\cdot IJ - 2\}\Delta X$ | ... | $(IJK-1)\Delta X$ |

Furthermore, Table 2 provides another matrix (K Ranks × I·J Columns), in which the value $y_n \cdot \Delta X$ at (G, H) is found as $GIJ\Delta X + H\Delta X$ in the same manner as above. The values of the first rank are already obtained by way of the equations (4). Consequently the other values can be found from Table 2. For example, when $H\Delta X = EJ \cdot \Delta X + F \cdot \Delta X$, the values $y_n \cdot \Delta X$ can be obtained by way of an addition $y_n \cdot \Delta X = EJ \cdot \Delta X + F \cdot \Delta X + GIJ \cdot \Delta X$, which is the objective value. By repeatedly using the above-mentioned method, the memory capacity can be significantly reduced. For instance, as against the memory capacity corresponding to pixel addresses of the number $32 \times 32 \times 64 = 65,536$ being necessary conventionally, the reduced memory capacity provided according to the method of this invention, assuming that the values I, J and K of Table 2 are I=32, J=32 and K=64, is allowed to correspond to 128 pixel addresses.

Figure 5:
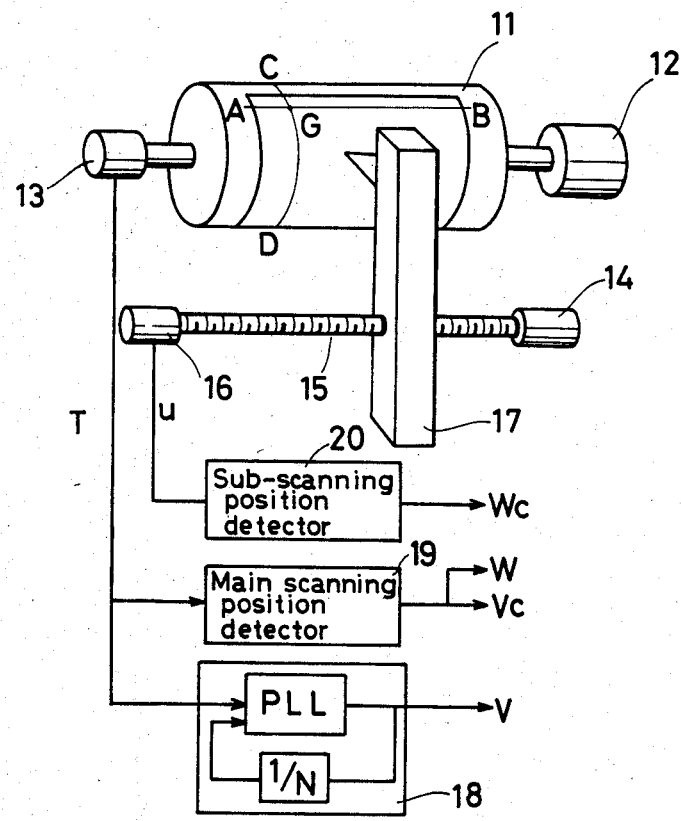
FIG. 5 shows a circuit for providing address data of the recording drum.
Figure 6A:
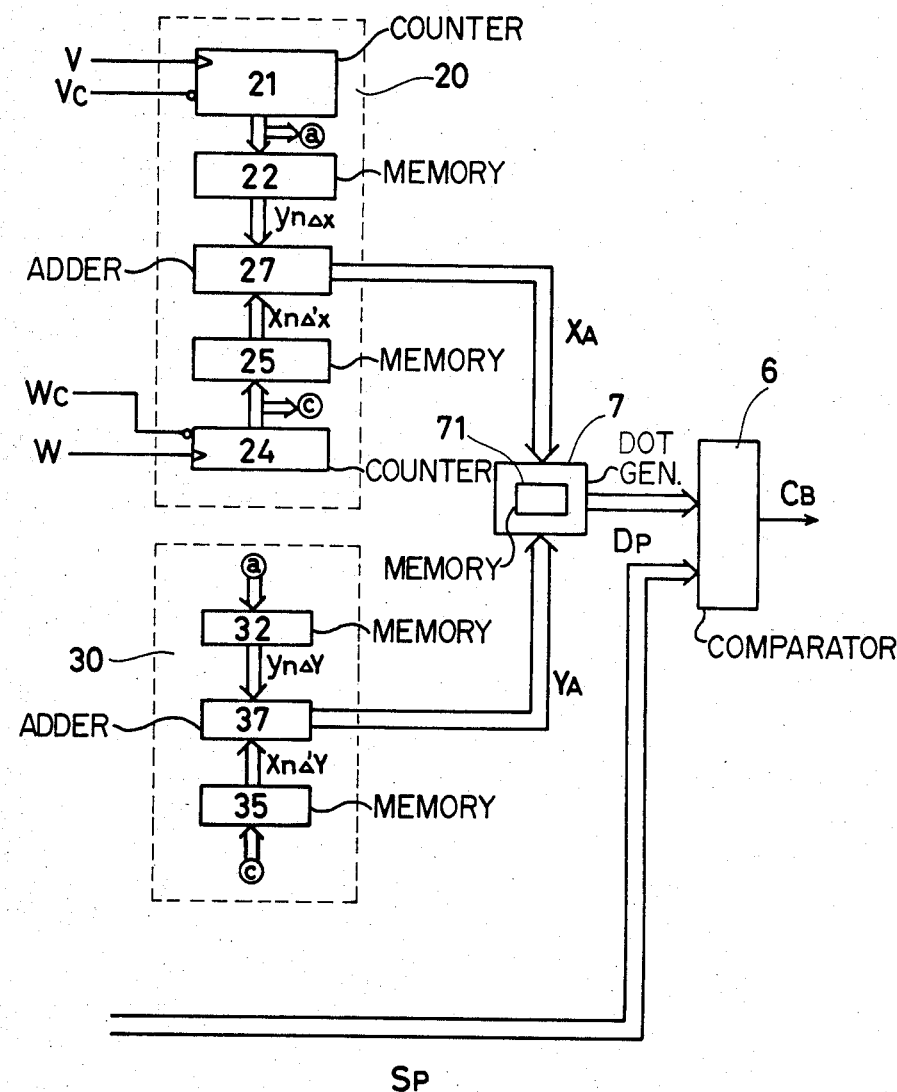
FIG. 6(A) shows an embodiment of this invention.
Figure 6:
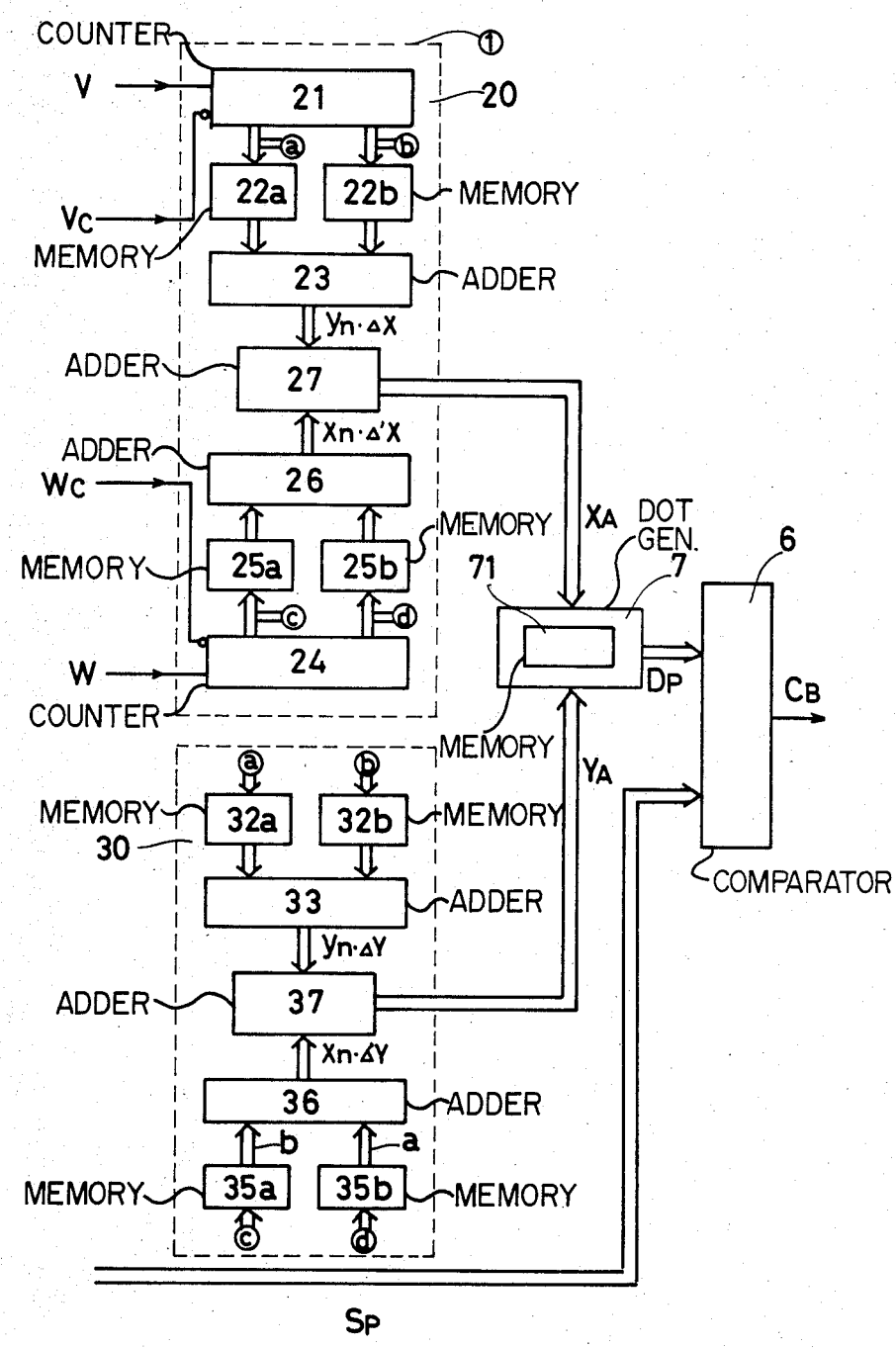
FIG. 6(B) shows another embodiment of this invention.

FIG. 5 shows a circuit for supplying a circuit of FIG. 6 with the addresses (pixel numbers) $y_n$ and $x_n$ of the respective main and the sub-scanning directions and other control data. Precisely, a main scanning encoder 13 coaxially connected to a recording drum 11 revolved by a motor 12 outputs a multiple pulse signal T each revolution of the recording drum. Meanwhile, a sub-scanning encoder 16 connected to a feed screw 15 of a recording head 17 revolved by a motor 14 outputs a pulse signal U synchronized with the revolution of the feed screw 15. Said signal T is input to a PLL circuit 18, which outputs a main scanning pixel pulse signal V corresponding to one pixel at the ratio of 1:1. The signal T is also input to a main scanning position detector 19, which outputs a clear pulse signal $V_c$ and a sub-scanning pixel pulse signal W when the recording point traverses a line AB which is parallel to the sub-scanning direction of the recording drum 11. On the other hand, said pulse signal U is input to a sub-scanning position detector 20, which outputs a clear pulse signal $W_c$ when the recording point traverses a line (CD) which is parallel to the main scanning direction of the recording drum 11.

FIGS. 6(A) and (B) show block diagrams of two embodiments of this invention, each of which comprises a circuit 20 for producing the X direction addresses $X_A$ for a screen pattern memory 71 of a halftone dot generator 7 and a circuit 30 for producing the Y direction addresses $Y_A$ for the same. The pulse number of the main scanning pixel pulse signal V is counted by a counter 21, the count value of which is the values $y_n$ of the equations (3). In the meantime, the pulse number of the sub-scanning pixel pulse signal W is counted by a counter 24, the count value of which is the values $x_n$ of the equation (3).

In the embodiment of FIG. 6(A), the values $y_n$ become the reading addresses for a memory 22, in which the values $y_n \cdot \Delta X$ for each of the values of $y_n$ are previously stored. Meanwhile the values $x_n$ become the reading addresses for a memory 25, in which the values $x_n \cdot \Delta'X$ for each of the values $x_n$ are previously stored. The values $y_n \cdot \Delta X$ and $x_n \cdot \Delta'X$ are summed up by an adder 27, which outputs the X direction addresses $X_A$. The Y direction addresses $Y_A$ is also obtained from the main scanning position detector 30 in the same manner, in which the values $y_n \cdot \Delta Y$ and $x_n \cdot \Delta'Y$ of the equations (3) are respectively stored in memories 32 and 35 and are summed up by an adder 37.

In FIG. 6(B), in order to perform the addition of the equations (4), memories $22_a$, $22_b$ and an adder 23 are substituted for the memory 22, memories $25_a$, $25_b$ and an adder 26 are substituted for the memory 25, memories $32_a$, $32_b$ and an adder 33 are substituted for the memory 32 and memories $35_a$, $35_b$ and an adder 36 are substituted for the memory 35. The memory $22_a$ stores the values F·ΔX (F: 0 to J−1) of the first rank of the matrix shown in Table 1, while the memory $22_b$ stores the values EJ·ΔX (E: 0 to I−1) of the first column of the same matrix. To the memory $22_a$ each of the values 0 to J−1 is input from the counter 21, while the memory $22_b$ each of the values 0 to I−1, which value is increased by one every time that the value to the memory $22_a$ exceeds the value J−1, are input from the counter 21. Then according to the values $y_n$ representative of the main scanning addresses, the memories $22_a$ and $22_b$ output the values F·ΔX and EJ·ΔX respectively to the adder 23, which subsequently performs the addition $y_n$·ΔX=EJ·ΔX+F·ΔX.

In the meantime, the memory $25_a$ stores the values F'·Δ'X (F: 0 to J−1) of the first rank of a matrix of the value $x_n$·Δ'X being equivalent to the matrix shown in Table 1, while the memory $25_b$ stores the values E'J·Δ'X (E: 0 to I−1) of the first column of the same matrix. In the same manner as described for the devices $22_a$, $22_b$ and 23, the memories $25_a$ and $25_b$ output the values F'X and E'J·Δ'X respectively to the adder 26, which performs the addition F'·ΔX+E'J·Δ'X=$x_n$·Δ'X.

The thus-obtained values $y_n$·ΔX and $x_n$·Δ'X are input to the adder 27, which sums up the values to obtain the X direction address $X_A$. In the same way, the Y direction addresses $Y_A$ can be obtained from a screen pattern generator 30. The addresses $X_A$ and $Y_A$ are input to the screen pattern memory 71 of the halftone dot generator 7. The threshold data $D_P$ output from the screen pattern memory 71 are input to a comparator 6 as shown in FIGS. 6(a) and 6(b), which compares it with an image signal $S_P$ to generate a beam control signal $C_B$. The signals $V_c$ and $W_c$ are provided for clearing the count numbers of the counters 21 and 24 respectively.

In obtaining the numerical specification of the embodiment of FIG. 6(B), at first it is assumed that the capacity of each of the memories $22_a$, $22_b$, $25_a$, $25_b$, $32_a$, $32_b$, $35_a$ and $35_b$ corresponds to 512 words (1 word: 9 bits). Since the 18 bit output signal of the counter 21 (9 bits for the memory $22_a$ and the other 9 bits for the memory $22_a$) is capable of representing the addresses of up to 512 (locations of the memory $22_a$)×512 (locations of the memory $22_b$)=262,144, which corresponds to 2.62 m when the area of one recording pixel is 10 μm×10 μm. Similarly, the output signal of the counter 24 is capable of representing 262,144 addresses, which also corresponds to 2.62 m under the same condition as above.

Then further assuming that the values of the parameters P, S, m and θ of the equations (2) are P=10 μm, S=254 μm (corresponding to a halftone dot of 100 1/inch), M=256 and θ=15 respectively, in view of the equations (3) the values ΔX and Δ'X are:

$$\Delta X = -\Delta' Y \tag{5}$$

$$= -\frac{P}{\left(\frac{S}{m}\right)} \sin\theta = \frac{-P \times m}{S} \sin\theta$$

$$= \frac{-10\mu m \times 256}{254\ m} \cdot \sin 15°$$

$$= -2.6085699$$

$$\Delta'X = \Delta Y \tag{6}$$

$$= \frac{P}{\left(\frac{S}{m}\right)} \cos\theta$$

$$= 9.7353154$$

While in the equation (4):

$$y_n \cdot \Delta X = EJ \cdot \Delta X + F \cdot \Delta X \tag{4}$$

$$x_n \cdot \Delta'X = E'J \cdot \Delta'X + F' \cdot \Delta'X$$

the inputs and the outputs of the memories $22_a$, $22_b$, $25_a$ and $25_b$ correspond to the terms EJ, F, E'J, F', F·ΔX, EJ·ΔX, F'·Δ'X, E'J·Δ'X respectively.

Because the values $y_n$ and $x_n$ are $y_n$=15 cm/10 μm and $x_n$=10 cm/10 μm, at a point 15 cm (in the main scanning direction) and 10 cm (in the sub-scanning direction) away from the origin (which corresponds to the intersecting point G of the lines AB and CD shown in FIG. 5), the address $X_a$ of the screen pattern memory is expressed as:

$$X_A = = -\frac{15,000}{10} \cdot \Delta X + \frac{10,000}{10} \cdot \Delta'X. \tag{7}$$

which, according to the computation results of the equations (5) and (6), can further be expressed as:

$$X_A = -39,128.548\ldots + 97,353.154\ldots$$

$$= 58,224.6\ldots$$

Therefore the particular address $X_{A(G)}$ varying from 0 to 225, if found to be $X_{A(G)}$=112.6.

The particular address $X_{A(G)}$ is particularly obtained as follows in the embodiment of the circuit of FIG. 6(B) under the same condition as mentioned before. It is assumed that the general values F·ΔX, Fj·ΔX, F'·Δ'X and F'J·Δ'X described below are the values of the particular point G (unindicated) for simplification. The values F and E of the equation (4) are, according to the output 15 cm/10 μm=15,000=512×29+152 of the counter 21, found to be F=152 and E=29 respectively. Therefore the value F·ΔX is:

$$F \cdot \Delta X = 152 \cdot \Delta X = 152 \times (-2.6085699\ldots)$$

$$= -396.50262\ldots$$

Since the value F·ΔX varies from 0 to 255, the value F·ΔX is:

$$F \cdot \Delta X = 152 \cdot \Delta X = 115.4973\ldots$$

Since one word is expressed in 9 bits, the value F·ΔX = 115.5 is stored in the address 152 of the memory $22_a$. In the same manner, the value Fj·ΔX is:

$$Fj \cdot \Delta X = 512 \times 29 \cdot \Delta X = -38,732.045 \ldots,$$

and since the value Fj·ΔX is $0 \leq Fj \cdot \Delta X \leq 255$, the value Fj·ΔX is:

$$Fj \cdot \Delta X = 512 \times 29 \cdot \Delta X = 179.955 \ldots,$$

therefore, the value Fj·ΔX = 180.0 is stored in the address 29 of the memory 26. The values F' and E' of the equations (4) are, according to the output 10 cm/10 μm = 10,000 = 512 × 19 + 272 of the counter 24, found to be F' = 272 and E' = 19 respectively. Therefore the value F'·Δ'X is:

$$F' \cdot \Delta' X = 272 \cdot \Delta' X = 272 \times 9.7353154 \ldots$$
$$= 2,648.0057 \ldots$$

Since the value F'·Δ'X is $0 \leq F' \cdot \Delta' X \leq 255$, the value F'·Δ'X is:

$$F' \cdot \Delta' X = 272 \cdot \Delta' X = 88.0057,$$

therefore the F'·Δ'X = 88.0 is stored in the address 272 of the memory $25_a$. While the value F'J·Δ'X is:

$$FJ \cdot \Delta' X = 512 \times 19 \cdot' X = 512 \times 19 \times 9.7353154 \ldots$$
$$= 94,705.146 \ldots$$

Since the value F'J·Δ'X is $0 \leq F'J \cdot \Delta' X \leq 255$, the value F'J·Δ'X is:

$$FJ \cdot \Delta' X = 241.146 \ldots,$$

therefore, the value F'J·Δ'X = 241.0 is stored in the address 19 of the memory $25_b$.

Therefore, the value $y_n \cdot \Delta X$ is:

$$y_n \cdot \Delta X = EJ \cdot \Delta X + F \cdot \Delta X$$
$$= 180.0 + 115.5$$
$$= 295.5,$$

Since the value $y_n \cdot \Delta X$ is $0 \leq y_n \cdot \Delta X \leq 255$, the value $y_n \cdot \Delta X$ is:

$$y_n \cdot \Delta X = 39.5,$$

which addition is performed in the adder 23.

Similarly, the value $x_n \cdot \Delta' X$ is:

$$x_n \cdot \Delta' X = E' \cdot \Delta' X + F' \cdot \Delta' X$$
$$= 241.0 + 88.0$$
$$= 329.0.$$

Since the value $x_n \cdot \Delta' X$ is $0 \leq x_n \cdot \Delta' X \leq 255$, the value $x_n \cdot \Delta' X$ is:

$$x_n \cdot \Delta' X = 73.0,$$

which addition is performed in the adder 26.

Consequently, the address $X_{A(G)}$ is:

$$X_{A(G)} = y_n \cdot \Delta X + x_n \cdot \Delta' X$$
$$= 39.5 + 73.0$$
$$= 112.5.$$

Therefore, a signal of the address $X_A = 112$ is input to the halftone dot generator 7. It should be noted that since said adders operate in 9 bits as against the 8 bits used for the address data of the halftone dot generator 7, computation errors are suppressed considerably.

Of course, the number of bits to be adopted for use should accord with the precision and manufacturing cost desired.

Figure 7:
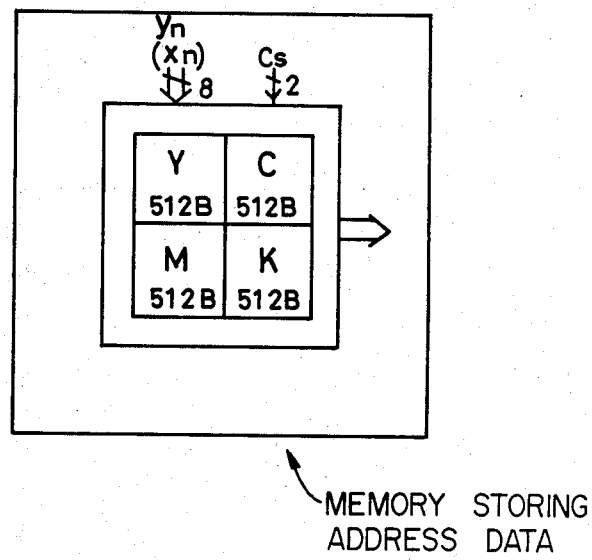
FIG. 7 shows a memory storing address data for four color separations Y, M, C and K.

By providing the values $y_n \cdot \Delta X$ and $x_n \cdot \Delta' X$ ($y_n \cdot \Delta Y$ and $x_n \cdot \Delta' Y$) of respective color separation images Y, M, C and K in the memories $22_a$, $22_b$, $25_a$, $25_b$, $32_a$, $32_b$, $35_a$ and $35_b$ of the embodiment of FIG. 6(B) as shown in FIG. 7, and by switching them using the switching signal $C_S$ (for example, 2 bit signal), one desired color separation image data can be output therefore instantly in a system capable of recording a plurality of images in the main scanning direction.

Figure 8:
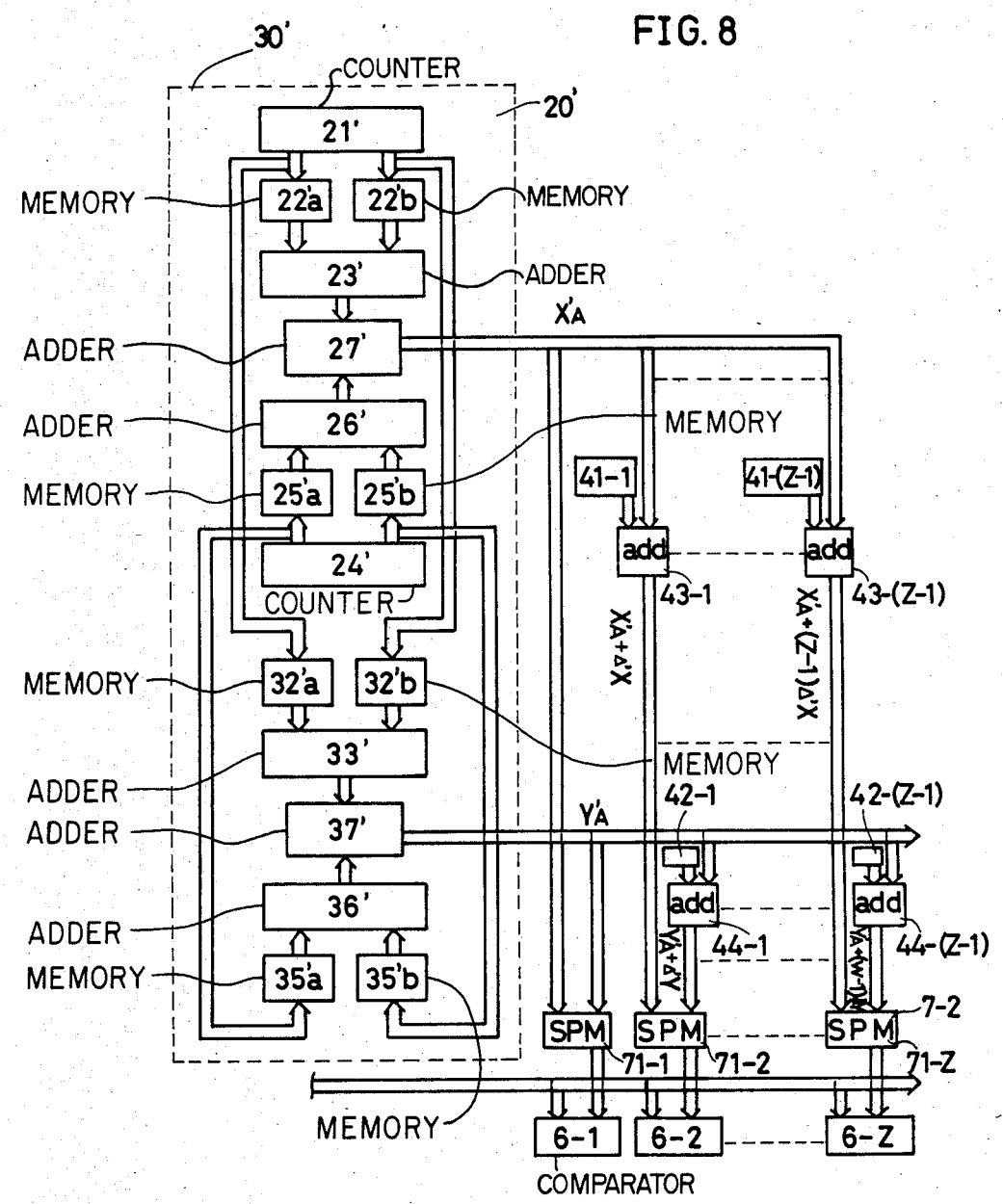
FIG. 8 shows an embodiment of this invention for simultaneously recording a plurality of pixels in the sub-scanning direction.

Although the embodiment of FIG. 6 is designed for exposing a photosensitive film one pixel by one pixel, when a plurality of pixels situated in the sub-scanning direction must be exposed simultaneously, a circuit as shown in FIG. 8 can be used instead. Assuming that the number of the pixels to be exposed simultaneously is Z, addresses $X'_A$ and $Y'_A$ corresponding to the first beam can be expressed by equations:

$$\left. \begin{array}{l} X'_A = y_n \cdot \Delta X + Z x_n \cdot \Delta' X \\ Y'_A = y_n \cdot \Delta Y + Z x_n \cdot \Delta' Y \end{array} \right\} \quad (8)$$

According to a matrix (I Ranks × J Columns) of the values $Z x_n \cdot \Delta' X$, the values $F''' \cdot \Delta X$ of the first rank are stored in a memory $25'_a$, while the values $E''J \cdot \Delta X$ of the first column are stored in a memory $25'_b$. The values 0 to J−1 from a counter 24' are successively input to a memory $25'_a$, while the values 0 to I−1, which increase by one when the value input to the memory $25'_a$ exceeds the value J−1, are successively input from the counter 24' to the memory $25'_b$. Meanwhile, according to a matrix (I Ranks × J Columns) of the values $Z x_n \cdot \Delta' Y$, the values $F''' \cdot \Delta' Y$ of the first rank are stored in a memory $35'_a$, while the values $E''J \cdot \Delta' Y$ of the first column are stored in a memory $35'_b$. The same values are input from the counter 24' to the memories $35'_a$ and $35'_b$ for the memories $25'_a$ and $25'_b$ respectively. Memories $22'_a$, $22'_b$ and $32'9$, $32'_b$ operate in the same way under control of the output value of a counter 21'. Consequently addresses $X'_A = y_n \cdot \Delta X + Z x_n \cdot \Delta' X$ and $Y'_A = y_n \cdot \Delta Y + Z x_n \cdot \Delta' Y$ are obtained from adders 27' and 37' respectively.

The above outputs are input to a screen pattern memory $71_{-1}$ as the reading address thereof. To other screen pattern memories $71_{-2} \ldots 71_{-Z}$, the following address signals are input using registers $41_{-1} \ldots 41_{-(Z-1)}$, $42_{-1} \ldots 42_{-(Z-1)}$ and adders $43_{-1} \ldots 43_{-(Z-1)}$, $44_{-1} \ldots 44_{-(Z-1)}$. That is, by storing the values $'X_1 \ldots (Z-1)'X$ and $'y \ldots (Z-1)'Y$ into the registers $41_{-1} \ldots 41_{-(Z-1)}$ and $42_{-1} \ldots 42_{-(Z-1)}$ respectively and by adding these values to the outputs $X'_A$ and $Y'_A$ of the adders 27' and 37' respectively, addresses $X_A + \Delta' X \ldots$ $X'_A+(Z-1)\cdot\Delta'X$, $Y'_A+\cdot\Delta'Y$ ... $Y'_A+(Z-1)\cdot\Delta'Y$ can be obtained.

In that regard, the values $y_n\cdot\Delta X$, $Zx_n\cdot\Delta'X$, $y_n\cdot\Delta Y$ and $Zx_n\cdot\Delta'Y$ can be respectively expressed as equations $$\left.\begin{array}{l} y_n \cdot \Delta X = Ej \cdot \Delta X + F \cdot \Delta X \\ Zx_n \cdot \Delta'X = E''J \cdot \Delta'X + F'' \cdot \Delta X \\ y_n \cdot \Delta Y = EJ \cdot \Delta Y + F \cdot \Delta Y \\ Zx_n \cdot \Delta'Y = E''J \cdot \Delta'Y + F'' \cdot \Delta'Y \end{array}\right\} \quad (4)'$$

when arranged in respective matrix (I Ranks×J Columns), and the terms of the right members of the equations (4)' can alternatively be expressed as EJ·ΔX mod m, F·ΔX mod m, E″J·ΔX mod m, F‴·ΔX mod m, EJ·ΔY mod m, F·ΔY mod m, E″J·ΔY mod m, and F‴·Δ′Y mod m, respectively.

As mentioned above, since this invention is capable of performing a computation for forming addresses according to the change of the screen angle by performing only additions of predetermined values stored in memories, the circuit for the process is permitted to have simpler structure.

Additionally, since the values stored in the memories have a periodicity, the capacities of the memories can be further reduced by taking advantage of the periodic characteristic.

Furthermore, since the values are in an arithmetic series, by storing the values of the first rank and the first column of a matrix in the memory and computing the other values using said values, the capacities of the memories can further be reduced.

What is claimed is:

1. A method for forming halftone dots onto a photosensitive film according to a recording signal obtained by comparing an image signal from an original with corresponding thresholds from a screen memory comprising the steps of:
   (a) obtaining sub-scanning addresses $x_n$ and main scanning addresses $y_n$ of recording points of a recording beam;
   (b) successively reading according to the equations:

$X_A = y_n\cdot\Delta X + x_n\cdot\Delta'X$, and $Y_A = y_n\cdot\Delta Y + x_n\cdot\Delta'Y$ (i) the values $y_n\cdot\Delta X$ stored in a first table memory addressed by $y_n$ according to the addresses $y_n$,
   (ii) the values $x_n\cdot\Delta'X$ stored in a second table memory addressed by $x_n$ according to the addresses $x_n$,
   (iii) the values $y_n\cdot\Delta X$ stored in a third table memory addressed by $x_n$ according to the addresses $y_n$, and
   (iv) the values $x_n\cdot\Delta'Y$ stored in a fourth table memory addressed by $y_n$ according to the addresses $x_n$, wherein $X_A$ = the sub-scanning addresses of the screen memory,
   $Y_A$ = the main scanning addresses of the screen memory,
   $x_n$ = the sub-scanning recording addresses (pixel numbers),
   $y_n$ = the main scanning recording addresses (pixel numbers), $\Delta X = -P \sin \theta / \frac{S}{m}$, -continued $\Delta Y = P \cos \theta / \frac{S}{m}$, $\Delta'X = P \cos \theta / \frac{S}{m}$, and $\Delta'Y = P \sin \theta / \frac{S}{m}$, $\theta$ = screen angle,
   P = the length of each side of one pixel,
   S = the length of each side of one unit of a screen memory, and
   m = the number of cells of the screen memory unit,
   (c) obtaining the sub-scanning addresses $X_A$ and the main scanning addresses $Y_A$ by respectively summing up the values ($\alpha$) $y_n\cdot\Delta X$ and $x_n\cdot\Delta'X$, and the values ($\beta$) $y_n\cdot Y$ and $x_n\cdot\Delta'Y$;
   (d) successively reading each of the thresholds corresponding to each of the halftone sub-cells from the location designated by the addresses $X_A$ and $Y_A$; and
   (e) applying the recording beam on said photosensitive film in accordance with said addresses $X_A$ and $Y_A$.

2. A method as recited in claim 1, in which $y_n\cdot\Delta X$ mod m, $x_n\cdot\Delta'X$ mod m, $y_n\cdot\Delta Y$ mod m, and $y_n\cdot\Delta'X$ mod m are used as the values to be stored respectively in the four table memories.

3. A method for forming halftone dots onto a photosensitive film according to a recording signal obtained by comparing an image signal from an original with corresponding thresholds from a screen memory comprising the steps of:
   (a) obtaining sub-scanning addresses $x_n$ and main scanning addresses $y_n$ of recording points of a recording beam;
   (b) successively reading according to the equations:

$X_A = y_n\cdot\Delta X + x_n\cdot\Delta'X$, and $Y_A = y_n\cdot\Delta Y + x_n\cdot\Delta'Y$ (i) the values EJ·ΔX from a first table memory stored with addresses 0 to J−1 and the values F·ΔX from a second table memory stored with addresses 0 to (I−1) J according to the addresses $y_n$, the values EJ·ΔX (0≦E≦I−1) and F·ΔX (0≦F≦J−1) being respectively of the first column and the first rank of a matrix of values $y_n\cdot\Delta X$ (I Ranks×J Columns),
   (ii) the values E′J·Δ′X from a third table memory stored with addresses 0 to J−1 and the values F′·Δ′X from a fourth table memory stored with addresses 0 to (I−1)·J according to the addresses $x_n$, the values E′J·Δ′X (0≦E≦I−1) and F′·Δ′X (0≦F′≦J−1) being respectively of the first column and the first rank of a matrix of values $x_n\cdot\Delta'X$ (I Ranks×J Columns),
   (iii) the values EJ·ΔY from a fifth table memory stored with addresses 0 to J−1 and the values F·ΔY from a sixth table memory stored with addresses 0 to (I−1) J according to the addresses $y_n$, the values EJ·ΔY and F·ΔY being respectively of the first column and the first rank of a matrix of values $y_n\cdot\Delta Y$ (I×Ranks J Columns), and
   (iv) the values E′J·ΔY from a seventh table memory stored with addresses 0 to J−1 and the values F′·Δ′Y from an eighth table memory stored with addresses 0 to (I−1) J according to the addresses $x_n$, the values $E'J \cdot \Delta'Y$ and $F' \cdot \Delta Y$ being respectively of the first column and the first rank of a matrix of values $x_n \cdot \Delta'Y$ (I Ranks×J Columns); wherein $X_A$ = the sub-scanning addresses of the screen memory,
$Y_A$ = the main scanning addresses of the screen memory,
$x_n$ = the sub-scanning recording addresses (pixel numbers),
$y_n$ = the main scanning recording addresses (pixel numbers), $$\Delta X = -P \sin \theta / \frac{S}{m},$$

$$\Delta Y = P \cos \theta / \frac{S}{m},$$

$$\Delta' X = P \cos \theta / \frac{S}{m}, \text{ and}$$

$$\Delta' Y = P \sin \theta / \frac{S}{m},$$

$\theta$ = screen angle
P = the length of each side of one pixel,
S = the length of each side of one unit of a screen memory, and
m = the number of cells of the screen memory unit,
(c) obtaining the values $y_n \cdot \Delta X$, $x_n \cdot \Delta'X$, $y_n \cdot \Delta Y$ and $x_n \cdot \Delta'Y$ according to a second set of equations:

$$y_n \cdot \Delta X = EJ \cdot \Delta X + F \cdot \Delta X, \quad \text{(i)}$$

$$x_n \cdot \Delta'X = E'J \cdot \Delta'X + F \cdot \Delta'X, \quad \text{(ii)}$$

$$y_n \cdot \Delta Y = EJ \cdot \Delta Y + F \cdot \Delta Y, \quad \text{(iii)}$$

and $$x_n \cdot \Delta'Y = E'J \cdot \Delta'Y + F \cdot \Delta'Y; \quad \text{(iv)}$$

(d) obtaining the sub-scanning addresses $X_A$ and the main scanning addresses $Y_A$ of the screen memory according to the first set of equations:

$$X_A = y_n \cdot \Delta X + x_n \cdot \Delta'X, \text{ and}$$

$$Y_A = y_n \cdot \Delta Y + x_n \cdot \Delta'Y;$$

(e) successively reading each of the thresholds corresponding to each of the halftone sub-cells from the location designated by the addresses $X_A$ and $Y_A$; and
(f) applying the recording beam on said photosensitive film in accordance with said addresses $X_A$ and $Y_A$.

4. A method as recited in claim 3, in which values $EJ \cdot \Delta X$ mod m, $F \cdot \Delta X$ mod m, $E'J \cdot \Delta'X$ mod m, $F' \cdot 66\,'X$ mod m, $EJ \cdot \Delta Y$ mod m, $F \cdot \Delta Y$ mod m, $E'J \cdot \Delta'Y$ mod m, and $F' \cdot \Delta'Y$ mod m are used as the values to be stored respectively in the eight table memories.

5. A method for forming halftone dots onto a photosensitive film according to a recording signal obtained by comparing an image signal from an original with corresponding thresholds from a screen memory comprising the steps of:

(a) obtaining sub-scanning addresses $Zx_n$ and main scanning addresses $y_n$ of recording points of a plurality of recording beams;
(b) successively reading according to the equations:

$$X''_A = y_n \cdot \Delta X + Zx_n \cdot \Delta'X, \text{ and}$$

$$Y''_A = y_n \cdot \Delta Y + Zx_n \cdot \Delta'Y$$

(i) the values $EJ \cdot \Delta X$ from a first table memory stored with addresses 0 to J−1 and the values $F \cdot \Delta X$ from a second table memory stored with addresses 0 to (I−1) J according to the addresses $y_n$, the values $EJ \cdot \Delta X$ ($0 \leq E \leq I-1$) and $F \cdot \Delta X$ ($0 \leq F \leq J-1$) being respectively of the first column and the first rank of a matrix of values $y_n \cdot \Delta X$ (I Ranks×J Columns),
(ii) the values $E''J \cdot \Delta'X$ from a third table memory stored with addresses 0 to J−1 and the values $F''' \cdot \Delta'X$ from a fourth table memory stored with addresses 0 to (I−1) J according to the addresses $x_n$, the values $E''J \cdot \Delta'X$ ($0 \leq E'' \leq I-1$) and $F''' \cdot \Delta'X$ ($0 \leq F''' \leq J-1$) being respectively of the first column and the first rank of a matrix of values $x_n \cdot \Delta'X$ (I Ranks×J Columns),
(iii) the values $EJ \cdot \Delta Y$ from a fifth table memory stored with addresses 0 to J−1 and the values $F \cdot \Delta Y$ from a sixth table memory stored with addresses 0 to (I−1) J according to the addresses $y_n$, the values $EJ \cdot \Delta Y$ and $F \cdot \Delta Y$ being respectively of the first column and the first rank of a matrix of values $y_n \cdot \Delta Y$ (I Ranks×J Columns), and
(iv) the values $E''J \cdot \Delta'Y$ from a seventh table memory stored with addresses 0 to J−1 and the values $F''' \cdot \Delta'Y$ from an eighth table memory stored with addresses 0 to (I−1) J according to the addresses $x_n$, the values $E''J \cdot \Delta'Y$ and $F''' \cdot \Delta Y$ being respectively of the first column and the first rank of a matrix of values $x_n \cdot \Delta'Y$ (I Ranks×J Columns), wherein $X'_A$ = the sub-scanning addresses corresponding to the first scanning line,
$Y'_A$ = the main scanning addresses corresponding to the first scanning line,
$x_n$ = the sub-scanning recording addresses (pixel numbers),
$y_n$ = the main scanning recording addresses (pixel numbers), $$\Delta X = -P \sin \theta / \frac{S}{m},$$

$$\Delta Y = P \cos \theta / \frac{S}{m},$$

$$\Delta' X = P \cos \theta / \frac{S}{m}, \text{ and}$$

$$\Delta' Y = P \sin \theta / \frac{S}{m},$$

$\theta$ = screen angle,
P = the length of each side of one pixel,
S = the length of each side of one unit of a screen memory, and
m = the number of cells of the screen memory unit,
(c) obtaining the values $y_n \cdot \Delta X$, $x_n \cdot \Delta'X$, $y_n \cdot \Delta Y$ and $x_n \cdot \Delta'Y$ according to a second set of equations:

$$y_n \cdot \Delta X = EJ \cdot \Delta X + F \cdot \Delta X, \quad \text{(i)}$$

$$x_n \cdot \Delta'X = E''J \cdot \Delta'X + F'' \cdot J \cdot \Delta'X \quad \text{(ii)}$$

$$y_n \cdot \Delta Y = EJ \cdot \Delta Y + F \cdot \Delta Y, \quad \text{(iii)}$$

and $$x_n \cdot \Delta'Y = E''J \cdot \Delta'Y + F'' \cdot \Delta'Y; \quad \text{(iv)}$$

(d) obtaining the sub-scanning addresses $X'_A$ and the main scanning addresses $Y'_A$ of the screen memory according to the first set of equations:

$$X'_A = y_n \cdot \Delta X + x_n \cdot \Delta'X, \text{ and}$$

$$Y'_A = y_n \cdot \Delta Y + x_n \cdot \Delta'Y;$$

(e) obtaining
 (i) the sub-scanning addresses of the other recording points to be simultaneously scanned by summing up the addresses $X'_A$ and $\delta \cdot \Delta'X$ ($\delta$: 0 to $Z-1$), and
 (ii) the main scanning addresses of the other recording points to be simultaneously scanned by summing up the addresses $Y'_A$ and $\delta \cdot \Delta'Y$ ($\delta$: 0 to $Z-1$);
(f) successively reading each of the thresholds corresponding to each of the halftone sub-cells from the location designated by the addresses $X_A$ and $Y_A$; and
(g) applying the recording beam on said photosensitive film in accordance with said addresses $X'_A$ and $Y'_A$.

6. A method as recited in claim 5, in which values EJ·ΔX mod m, F·ΔX mod m, E″J·ΔX mod m, F″·ΔX mod m, EJ·ΔY mod m, F·ΔY mod m, E″J·ΔY mod m, and F″·ΔY mod m are used as the values to be stored in respective corresponding table memories.

7. An apparatus for forming halftone dots onto a photosensitive film according to a recording signal obtained by comparing an image signal from an original with corresponding thresholds from a screen memory comprising:

(a) a means for generating the sub-scanning addresses $x_n$ and the main scanning addresses $y_n$ of recording points of a recording beam;
(b) table memories for respectively storing according to the equations:

$$X = y_n \cdot \Delta X + x_n \cdot \Delta'X, \text{ and}$$

$$Y_A = y_n \cdot \Delta Y + x_n \cdot \Delta'Y$$

(i) the values $y_n \cdot \Delta X$ according to the addresses $y_n$,
 (ii) the values $x_n \cdot \Delta'X$ according to the addresses $x_n$,
 (iii) the values $y_n \cdot \Delta X$ according to the addresses $x_n$, and
 (iv) the values $x_n \cdot \Delta'Y$ according to the addresses $y_n$;
wherein
$X_A$ = the sub-scanning addresses of the screen memory,
$Y_A$ = the main scanning addresses of the screen memory,
$x_n$ = the sub-scanning recording addresses (pixel numbers),
$y_n$ = the main scanning recording addresses (pixel numbers), $$\Delta X = -P \sin \theta / \frac{S}{m},$$

$$\Delta Y = P \cos \theta / \frac{S}{m},$$

-continued $$\Delta'X = P \cos \theta / \frac{S}{m}, \text{ and}$$

$$\Delta'Y = P \sin \theta / \frac{S}{m},$$

P = the length of each side of one pixel,
S = the length of each side of one unit of a screen memory, and
(c) two adders for respectively obtaining the sub-scanning addresses $X_A$ and the main scanning addresses $Y_A$ by respectively summing up the values ($\alpha$) $y_n \cdot \Delta X$ and $x_n \cdot \Delta'X$, and the values ($\beta$) $y_n \cdot \Delta Y$ and $x_n \cdot \Delta'Y$;
(d) a screen memory for storing halftone sub-cell thresholds with the addresses $X_A$ and $Y_A$; and
(e) means for applying the recording beam on said photosensitive film in accordance with said addresses $X_A$ and $Y_A$.

8. An apparatus as recited in claim 7, in which the four table memories respectively store values $y_n \cdot \Delta X$ mod m, $x_n \cdot \Delta'X$ mod m, $y_n \cdot \Delta Y$ mod m, and $y_n \cdot \Delta'X$ mod m.

9. An apparatus claimed in claim 7, in which the address signal generation means comprises:

(a) a timing pulse generator for generating (i) a main scanning address signal and (ii) a sub-scanning address signal corresponding to the number of pixels in respective directions, (iii) a counter clear pulse every time the recording point comes to the forward edges of the main scanning lines and (iv) a counter clear pulse every time the recording point comes to a start point of the sub-scanning direction respectively according to the output of a rotary encoder which detects the angular position of a redording drum and the output of a rotary encoder which detects the sub-scanning position of the recording head;
(b) a sub-scanning address counter for counting the sub-scanning timing pulses, said sub-scanning address counter connected to be cleared by said counter clear pulse of the main scanning direction; and
(c) a main scanning address counter for counting the main scanning timing pulses, said main scanning address counter connected to be cleared by said counter clear pulse of the sub-scanning direction.

10. An apparatus for forming halftone dots onto a photosensitive film according to a recording signal obtained by comparing an image signal frm an original with corresponding thresholds from a screen memory comprising:

(a) a means for generating the sub-scanning addresses $x_n$ and the main scanning addresses $y_n$ of recording points of a recording beam;
(b) eight table memories for respectively storing according to the equations:

$$X_A = y_n \cdot \Delta X + x_n \cdot \Delta'X, \text{ and}$$

$$Y_A = y_n \cdot \Delta Y + x_n \cdot \Delta'Y$$

(i) the values EJ·ΔX stored with the addresses 0 to $J-1$, the values EJ·ΔX ($0 \leq E \leq I-1$) being the first column of a matrix of the values $y_n \cdot \Delta X$ (I Ranks × J Columns), (ii) the values F·ΔX stored with the addresses 0 to (I−1) J, the values F·ΔX (0≦F≦J−1) being the first rank of a matrix of the values $y_n$·ΔX (I Ranks × J Columns), (iii) the values E'J·Δ'X stored with the addresses 0 to J−1, the values E'J·Δ'X (0≦E≦I−1) being the first column of a matrix of the values $x_n$·Δ'X (I Ranks × J Columns), (iv) the values F'·Δ'X stored with the addresses 0 to (I−1) J, the values F'·Δ'X (0≦F'≦J−1) being the first rank of a matrix of the values $x_n$·Δ'X (I Ranks × J Columns), (v) the values EJ·ΔY stored with the addresses 0 to J−1, the values EJ·ΔY being the first column of a matrix of the values $y_n$·ΔY (I Ranks × J Columns), (vi) the values F·ΔY stored with the addresses 0 to (I−1) J, the values F·ΔY being the first rank of a matrix of the values $y_n$·ΔY (I Ranks × J Columns), (vii) the values E'J·Δ'Y stored with the addresses 0 to J−1, the values E'J·Δ'Y being the first column of a matrix of the values $x_n$·Δ'Y (I Ranks × J Colmns), (viii) the values F'·Δ'Y stored with the addresses 0 to (I−1) J, the values F'·Δ'Y being the first rank of the matrix of values $x_n$·Δ'Y (I Ranks × J Columns), wherein $X_A$ = the sub-scanning addresses of the screen memory, $Y_A$ = the main scanning addresses of the screen memory, $x_n$ = the sub-scanning recording addresses (pixel numbers), $y_n$ = the main scanning recording addresses (pixel numbers), $$\Delta X = -P \sin \theta / \frac{S}{m},$$

$$\Delta Y = P \cos \theta / \frac{S}{m},$$

$$\Delta'X = P \cos \theta / \frac{S}{m}, \text{ and}$$

$$\Delta'Y = P \sin \theta / \frac{S}{m},$$

O = the screen angle,
P = the length of each side of one pixel,
S = the length of each side of one unit of a screen memory, and
m = the number of cells of the screen memory unit, (c) (i) a first adder for summing up the values F·ΔX (0≦F≦J−1) and the values EJ·ΔX (0≦E≦I−1) output from the table memories corresponding to the values $y_n$·ΔX, (ii) a second adder for suming up the values F'·Δ'X (0≦F'≦J−1) and the values E'J·Δ'X (0≦E'≦I−1) output from the table memories corresponding to the values $x_n$·Δ'X, (iii) a third adder for summing up the values F·ΔY and the values EJ·ΔY output from the table memories corresponding to the values $y_n$·ΔY, and (iv) a fourth adder for summing up the values F'·Δ'Y and the values E'J·Δ'Y output from the table memories corresponding to the values $x_n$·Δ'Y;

(d) (i) a fifth adder for summing up the outputs of the first and the second adders to obtain the sub-scanning addresses $X_A$, and (ii) a sixth adder for summing up the outputs of the third and the fourth adders to obtain the main scanning addresses $Y_A$;

(e) a screen memory storing halftone sub-cell threshold values according to the addresses $X_A$ and $Y_A$ and (f) means for applying a recording beam on said photosensitive film in accordance with said addresses $X_A$ and $Y_A$.

11. An apparatus rercited in claim 10, in which values EJ·ΔX mod m, F·ΔX mod m, E'J·Δ'X mod m, F'·Δ'X mod m, EJ·ΔY mod m, F·ΔY mod m, E'J·Δ'Y mod m, and F'·Δ'Y mod m are used as the values to be stored respectively in the eight table memories.

12. An apparatus claimed in claim 10, in which values EJ·ΔX mod m, F·ΔX mod m, E''J·ΔX mod m, F''·ΔX mod m, EJ·ΔY mod m, F·ΔY mod m, E''J·ΔY mod m, and F'''·ΔY mod m are used as the values to be stored in respective corresponding table memories.

13. An apparatus for forming halftone dots onto a photosensitive film according to recording signal obtained by comparing an image signal from an original with corresponding thresholds from a screen memory comprising:

(a) a means for generating the sub-scanning addresses $Zx_n$ and the main scanning addresses $y_n$ of recording points of a plurality of recording beams;

(b) eight table memories for respectively storing according to the equations:

$$X_A = y_n \cdot \Delta X + x_n \cdot \Delta'X, \text{ and}$$

$$Y_A = y_n \cdot \Delta Y + x_n \cdot \Delta'Y$$

(i) the values EJ·ΔX stored with the addresses 0 to J−1, the values EJ·ΔX (0≦E≦I−1) being the first column of a matrix of the values $y_n$·ΔX (I Ranks × J Columns), (ii) the values FΔX stored with the addresses 0 to (I−1) J, the values F·ΔX (0≦F≦J−1) being the first rank of a matrix of the values $y_n$·ΔX, (iii) the values E''J·Δ'X stored with the addresses 0 to J−1, the values E''J·Δ'X (0≦E''≦I−1) being the first column of a matrix of the values $x_n$·Δ'X (I Ranks × J Columns), (iv) the value F'''·Δ'X stored with the addresses 0 to (I−1) J, the values F'''·Δ'X (0≦F''≦J−1) being the first rank of a matrix of the values $x_n$·Δ'X, (v) the values EJ·ΔY stored with the addresses 0 to J−1, the values EJ·ΔY being the first column of a matrix of the values $y_n$·ΔY (I Ranks × J Columns), (vi) the values F·ΔY stored with the addresses 0 to (I−1) J, the values F·ΔY being the first rank of a matrix of the values $y_n$·ΔY, (vii) the values E''J·Δ'Y stored with the addresses 0 to J−1, the values E''J·Δ'Y being the first column of a matrix of the values $x_n$·Δ'Y (I Ranks × J Columns), (viii) the values F'''·Δ'Y stored with the addresses 0 to (I−1) J, the values F'''·Δ'Y being the first rank of the matrix of values $x_n$·Δ'Y; wherein $X_A$ = the sub-scanning addresses of the screen memory, $Y_A$ = the main scanning addresses of the screen memory, $x_n$ = the sub-scanning recording addresses (pixel numbers), $y_n$ = the main scanning recording addresses (pixel numbers), $$\Delta X = -P \sin \theta / \frac{S}{m},$$

$$\Delta Y = P \cos \theta / \frac{S}{m},$$

$$\Delta'X = P \cos \theta / \frac{S}{m}, \text{ and}$$

$$\Delta'Y = P \sin \theta / \frac{S}{m},$$

$\theta$ = screen angle,
P = the length of each side of one pixel,
S = the length of each side of one unit of a screen memory, and
m = the number of cells of the screen memory unit, (c) (i) a first adder for summing up the values F·ΔX and the values EJ·ΔX output from the table memories corresponding to the values $y_n$·ΔX, (ii) a second adder for summing up the values F″·Δ′X and the values E″J·Δ′X output from the table memories corresponding to the values $x_n$·Δ′X, (iii) a third adder for summing up the values F·ΔY and the values EJ·ΔY output from the table memories corresponding to the values $y_n$·ΔY, and (iv) a fourth adder for summing up the values F″·Δ′Y and the values E″J·Δ′Y output from the table memories corresponding to the values $x_n$·Δ′Y;

(d) (i) a fifth adder for summing up the outputs of the first and the second adders to obtain the sub-scanning addresses X′$_A$, and (ii) a sixth adder for summing up the outputs of the third and the fourth adders to obtain the main scanning addresses Y′$_A$; and (e) (i) adders for summing up each of the addresses X′$_A$ of the output of the fifth adder and each of the values 0 to (Z−1)·Δ′X, (ii) adders for summing up each of the addresses Y′$_A$ of the output of the sixth adder and each of the values 0 to (Z−1)·Δ′Y;

(f) screen memories whose halftone sub-cell threshold storing addresses for each of the scanning beams are (X′$_A$, Y′$_A$), X′$_A$+·Δ′X, Y′$_A$+·Δ′Y) . . . (X′$_A$+(Z−1)·Δ′X, Y′$_A$+(Z−1)·Δ′Y respectively; and (g) means for applying the recording beam on said photosensitive film in accordance with said addresses X′$_A$ and Y′$_A$.

* * * * *